(12) United States Patent
Singh et al.

(10) Patent No.: US 10,044,192 B2
(45) Date of Patent: Aug. 7, 2018

(54) PARTICIPATION FACTOR BASED METHOD FOR RESYNCHRONIZATION OF MICROGRIDS

(71) Applicant: ABB Technology Ltd., Zurich (CH)

(72) Inventors: Ravindra Singh, Cary, NC (US); Dmitry Ishchenko, Cary, NC (US)

(73) Assignee: ABB Schweiz AG, Baden (CH)

(*) Notice: Subject to any disclaimer, the term of this patent is extended or adjusted under 35 U.S.C. 154(b) by 206 days.

(21) Appl. No.: 15/017,346

(22) Filed: Feb. 5, 2016

(65) Prior Publication Data

US 2017/0229870 A1 Aug. 10, 2017

(51) Int. Cl.
*H02J 1/10* (2006.01)
*H02J 3/38* (2006.01)

(52) U.S. Cl.
CPC .............. *H02J 3/383* (2013.01); *H02J 3/386* (2013.01); *H02J 3/387* (2013.01)

(58) Field of Classification Search
CPC ............ H02J 3/38; H06Q 50/06; H05B 15/02
See application file for complete search history.

(56) References Cited

U.S. PATENT DOCUMENTS

| 5,521,482 A | 5/1996 | Lang et al. |
| 2010/0207456 A1 | 8/2010 | Lasseter et al. |
| 2015/0076823 A1 | 3/2015 | Ali |
| 2015/0149128 A1 | 5/2015 | Baone |
| 2015/0295581 A1* | 10/2015 | Shi .............................. H02J 3/40 700/287 |
| 2016/0266559 A1* | 9/2016 | Shi ........................ G05B 19/042 |

OTHER PUBLICATIONS

Da Silva, L.C.P. et al., "Assessment of generator impact on system power transfer capability using modal participation factors", IEE Proceedings—Generation, Transmission and Distribution, vol. 149, No. 5, Sep. 2002, pp. 564-570.
Search Report and Written Opinion, PCT Appln. No. PCT/US17/16710, dated Apr. 21, 2017.

* cited by examiner

*Primary Examiner* — Sibin Chen
(74) *Attorney, Agent, or Firm* — Taft Stettinius & Hollister LLP; J. Bruce Schelkopf (57) ABSTRACT

A microgrid is re-synchronized to a main grid or substation by determining a degree of bus angle or frequency mismatch and bus voltage mismatch between the microgrid and the main grid or substation prior to re-synchronization, determining an amount of power adjustment needed to reduce the bus angle or frequency mismatch and bus voltage mismatch to below respective predetermined thresholds, determining at least one participation factor for each microgrid bus, each participation factor indicating an amount of influence power injection by the corresponding bus has on the bus angle or frequency mismatch or on the voltage mismatch, allocating the amount of power adjustment to the microgrid buses in proportion to the participation factors assigned to the buses, and re-synchronizing the microgrid to the main grid or substation responsive to the bus angle or frequency mismatch and bus voltage mismatch satisfying the respective predetermined thresholds.

23 Claims, 3 Drawing Sheets

PARTICIPATION FACTOR BASED METHOD FOR RESYNCHRONIZATION OF MICROGRIDS

TECHNICAL FIELD

The instant application relates to microgrids, and more particularly to microgrid re-synchronization.

BACKGROUND

A microgrid is a semiautonomous or fully autonomous grouping of distributed energy resources (distributed generation, energy storage) and controllable loads within a local area. The loads can be one utility "customer," a grouping of several sites, or dispersed sites that operate in a coordinated fashion also known as aggregated loads. The distributed electric generators can include reciprocating engine generators, microturbines, fuel cells, photovoltaic/solar, gas turbines and other small-scale renewable generators. All controllable distributed energy resources and loads are interconnected in a manner that enables devices to perform certain microgrid control functions. For example, the energy balance of the system must be maintained by dispatch and non-critical loads might be curtailed or shed during times of energy shortfall or high operating costs. While capable of operating independently of the grid (in islanded mode), the microgrid usually functions interconnected (in grid-connected mode) with a substation or main grid both of which are referred to herein as a grid, purchasing energy from the grid or system operator and potentially selling back energy and ancillary services at different times. Microgrids are typically designed based on the total system energy requirements of the microgrid also known as net-metering. Heterogeneous levels of power quality and reliability are typically provisioned to end-uses. A microgrid is typically presented to the grid as a single controllable entity.

Conventional distribution grids were designed as passive networks in which power flows from a transmission grid to end customers. However, due to large penetration of renewables and active loads such as electrical vehicles, residential PV and storage the distribution grid is becoming more dynamic. The dynamic nature of a distribution grid poses several challenges in terms of power flow and control. In addition, extreme weather conditions have caused vulnerabilities of traditional distribution grids. Operating distribution circuits such as microgrids provide a unified elegant solution to these problems. One advantage of a microgrid is that it can operate in both grid-connected mode and islanded mode. However, there are some challenges in both of these operational modes. For example, an islanded microgrid requires re-synchronization before it can be re-connected to the grid (i.e. a substation or main grid). Re-synchronization involves ensuring bus voltages, frequency and bus angle ideally match or are at least within some acceptable tolerance. Conventionally, a single large grid-forming diesel generator or the largest inverter in a microgrid with grid forming capability performs the re-synchronization. Accordingly, only the diesel generator or PV control system parameters can be adjusted to achieve synchronization. As such, there is a need for a more flexible and robust microgrid re-synchronization approach.

SUMMARY

According to an embodiment of a method of re-synchronizing a microgrid to a main grid or substation, the microgrid including a plurality of buses to which energy resources and loads are connected, the method comprises: determining a degree of bus angle or frequency mismatch and bus voltage mismatch between the microgrid and the main grid or substation prior to re-synchronization; determining an amount of power adjustment needed to reduce the bus angle or frequency mismatch and bus voltage mismatch to below respective predetermined thresholds; determining at least one participation factor for each of the buses, each participation factor indicating an amount of influence power injection by the corresponding bus has on the bus angle or frequency mismatch or on the voltage mismatch; allocating the amount of power adjustment to the buses in proportion to the participation factors assigned to the buses; and re-synchronizing the microgrid to the main grid or substation responsive to the bus angle or frequency mismatch and bus voltage mismatch satisfying the respective predetermined thresholds.

According to an embodiment of a controller for a microgrid that includes a plurality of buses to which energy resources and loads are connected, the controller comprises a re-synchronization unit operable to: determine a degree of bus angle or frequency mismatch and bus voltage mismatch between the microgrid and the main grid or substation prior to re-synchronization; determine an amount of power adjustment needed to reduce the bus angle or frequency mismatch and bus voltage mismatch to below respective predetermined thresholds; determine at least one participation factor for each of the buses, each participation factor indicating an amount of influence power injection by the corresponding bus has on the bus angle or frequency mismatch or on the voltage mismatch; allocate the amount of power adjustment to the buses in proportion to the participation factors assigned to the buses; and re-synchronize the microgrid to the main grid or substation responsive to the bus angle or frequency mismatch and bus voltage mismatch satisfying the respective predetermined thresholds.

According to another embodiment, a microgrid comprises a plurality of buses, energy resources and loads connected to the buses, one or more points of common coupling for connecting the buses to a substation or main grid, and a controller. The controller is operable to: determine a degree of bus angle or frequency mismatch and bus voltage mismatch between the microgrid and the main grid or substation prior to re-synchronization; determine the amount of power adjustment needed to reduce the bus angle or frequency mismatch and bus voltage mismatch to below respective predetermined thresholds; determine at least one participation factor for each of the buses, each participation factor indicating an amount of influence power injection by the corresponding bus has on the bus angle or frequency mismatch or on the voltage mismatch; allocate the amount of power adjustment to the buses in proportion to the participation factors assigned to the buses; and re-synchronize the microgrid to the main grid or substation responsive to the bus angle or frequency mismatch and bus voltage mismatch satisfying the respective predetermined thresholds.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

According to the exemplary embodiments described herein, an islanded microgrid is re-synchronized before being connected to a grid i.e. a substation or a main grid based on the participation factor of distributed energy resources available within the microgrid. The re-synchronization technique described herein utilizes the singular value sensitivity of real and/or reactive power source microgrid buses in computation of their participation factors. The power sharing of the energy resources based on participation factors indirectly modifies the voltage and frequency of the microgrid bus at the point of common coupling to the grid, and therefore aids in achieving target re-synchronization conditions. The re-synchronization technique described herein thus allows multiple distributed microgrid energy resources, some of which may be dynamic, to participate in the re-synchronization process.

Figure 1:
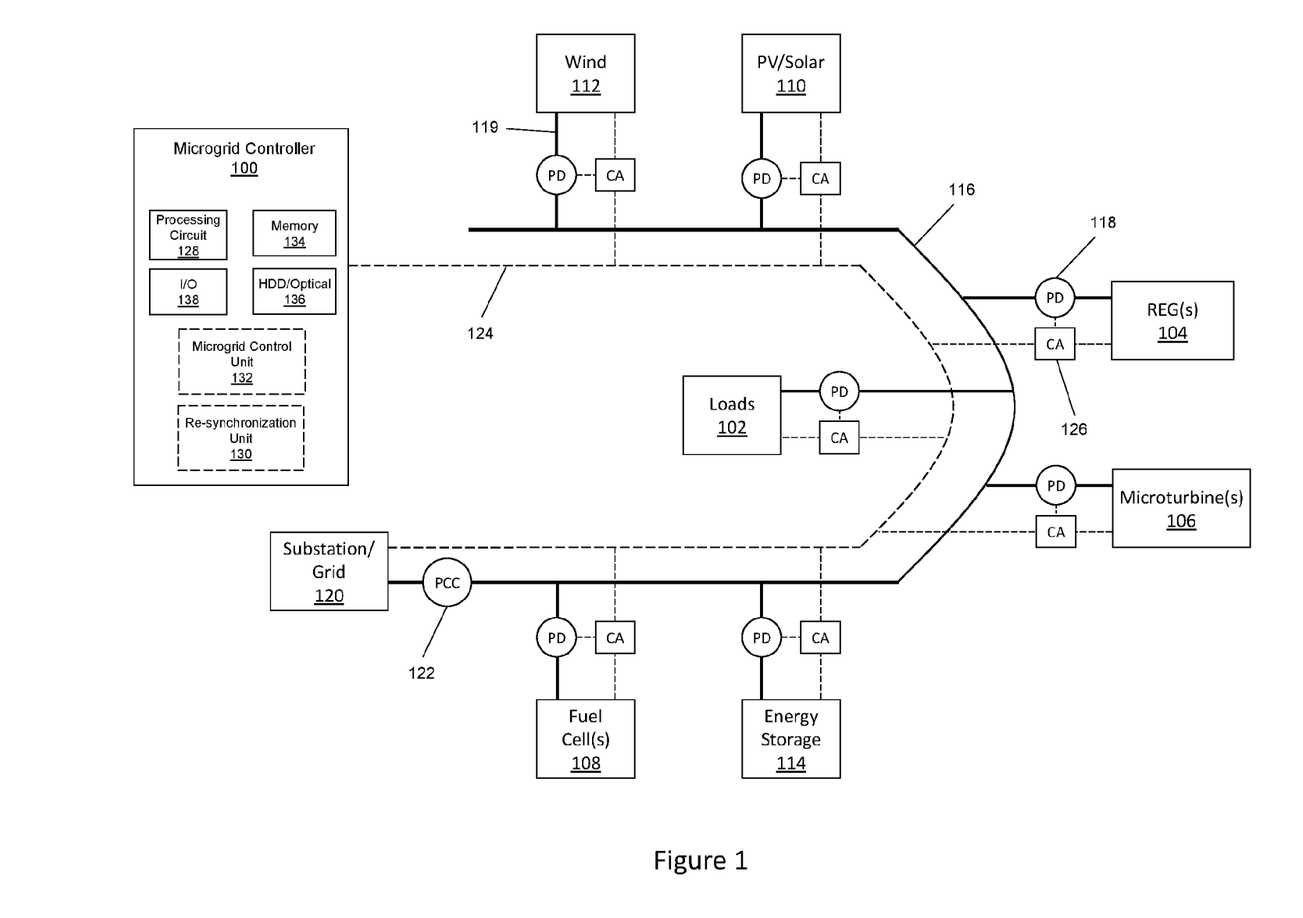
FIG. 1 illustrates a block diagram of an embodiment of a microgrid and corresponding controller which re-synchronizes the microgrid upon exiting islanded mode, based on a participation factor-based re-synchronizing technique.

FIG. 1 illustrates an embodiment of a microgrid controller 100 and a microgrid 102 controlled by the controller 100. The microgrid includes distributed energy resources (DERs) and loads 102 within a local area. The loads 102 can be a single utility customer, a grouping of several sites, or dispersed sites that operate in a coordinated fashion. The DERs can include one or more distributed electric generators such as reciprocating engine generator(s) (REGs) 104, microturbine(s) 106, fuel cell(s) 108, photovoltaic/solar generator(s) 110, wind turbine(s) 112, Combined Heat and Power (CHP) generators, and other small-scale renewable generators, and also electrical energy storage devices 114 such as batteries. The DERs and loads 102 are interconnected by an electric network 116. Each DER and load 102 can be connected to the electric network 116 by a protection device (PD) 118 such as a fuse, circuit breaker, relay, step-down transformer, etc., through a bus 119. The microgrid can be connected to a grid 120 such as a substation or main grid in grid-connected mode. One or more points of common coupling (PCC) 122 can be provided for connecting the electric network 116 to the grid 120. The microgrid can be isolated from all power grids, substations, etc. in an islanded mode by appropriate control of the PCC 122.

All controllable DERs and loads 102 included in the microgrid are interconnected by a communications and control network 124 so that the controllable devices can perform certain microgrid control functions. The microgrid controller 100 has remote or direct access to the communications and control network 124 of the microgrid, for controlling the DERs and loads 102 through local control agents (CA) 126. The microgrid controller 100 comprises a processing circuit 128 which can include digital and/or analog circuitry such as one or more controllers, processors, ASICs (application-specific integrated circuits), etc. for executing program code which performs the re-synchronization and microgrid control functions described herein. To this end, the microgrid controller 100 includes a re-synchronization unit 130 and a microgrid control unit 132 included in or associated with the processing circuit 128 for performing the re-synchronization and microgrid control functions, respectively. The microgrid controller 100 also has one or more storage media such as memory like DRAM (dynamic random access memory) 134 and an HDD (hard disk drive) and/or optical drive 136 for storing the program code and related data processed and accessed by the processing circuit 128, re-synchronization unit 130 and microgrid control unit 132 during execution of program code.

The microgrid controller 100 also has I/O (input/output) circuitry 138 for communicating with the controllable DERs and loads 102 over the communications and control network 124 via the local control agents 126. For example, the microgrid controller 100 can receive energy generation and load forecast information, DER power generation information and other information used in energy management control operations via the I/O circuitry 138. The microgrid controller 100 also can communicate power set points and other types of control information generated as part of the re-synchronization and microgrid control functions described herein to the controllable DERs and loads 102 via the I/O circuitry 138.

In addition to microgrid control functions, the microgrid controller 100 manages re-synchronization of the microgrid to the grid 120. To this end, the re-synchronization unit 130 included in or associated with the processing circuit 120 of the microgrid controller 100 determines a degree of bus angle or frequency mismatch ($\Delta\delta$ or $\Delta f$) and bus voltage mismatch ($\Delta V$) between the microgrid and the main grid 120 prior to re-synchronization. The re-synchronization unit 130 also determines an amount of real and/or reactive power adjustment ($\Delta P$ and/or $\Delta Q$) needed to reduce the bus angle or frequency mismatch and bus voltage mismatch to below respective predetermined thresholds, and determines at least one participation factor (PF) for each of the buses 119, each participation factor indicating an amount of influence (real or reactive) power injection by the corresponding bus 119 has on the bus angle or frequency mismatch or on the voltage mismatch. The re-synchronization unit 130 then allocates the amount of power adjustment to the buses 119 in proportion to the participation factors assigned to the buses 119, and re-synchronizes the microgrid to the grid 120 responsive to the bus angle or frequency mismatch and bus voltage mismatch satisfying the respective predetermined thresholds. Based on this re-synchronization technique, the microgrid buses 119 with higher participation factors contribute more to the power adjustment than the buses 119 with lower participation factors. The re-synchronization technique is described next in more detail.

The Newton-Raphson based load flow equation has the following form:

$$\begin{bmatrix} \Delta P \\ \Delta Q \end{bmatrix} = \begin{bmatrix} J_{\delta\delta} & J_{\delta V} \\ J_{V\delta} & J_{VV} \end{bmatrix} \begin{bmatrix} \Delta\delta \\ \Delta V \end{bmatrix} \quad (1)$$

where $\Delta P = [\Delta P_1 \ \Delta P_2 \ \ldots \ \Delta P_n]^T$, $\Delta Q = [\Delta Q_1 \Delta Q_2 \ \ldots \ \Delta Q_n]^T$, are real vectors of real and reactive power mismatch, $\Delta\delta = [\Delta\delta_1 \ \Delta\delta_2 \ \ldots \ \Delta\delta_n]^T$ and $\Delta V = [\Delta V_1 \ \Delta V_2 \ \ldots \ \Delta V_n]^T$ are the bus angle and bus voltage mismatch, $J_{\delta\delta}, J_{\delta V}, J_{V\delta}, J_{VV}$ are the matrices formed by partitioning the full Jacobean matrix, and n is the number of buses 119 included in the microgrid.

For real power and angle (or frequency) control, it is assumed that ΔQ=0 so as to obtain the following equation:

$$\Delta\delta = [J_{\delta\delta} - J_{\delta V} J_{VV}^{-1} J_{V\delta}]^{-1} \Delta P \quad (2)$$

Defining $[J_{\delta\delta} - J_{\delta V} J_{VV}^{-1} J_{V\delta}]^{-1} = H_P$ yields $$\Delta\delta = H_P \Delta P \quad (3)$$

where $H_P$ is a matrix that relates the amount of real power adjustment (ΔP) to the bus angle or frequency mismatch (Δδ or Δf).

The singular value decomposition of $H_P$ results in the following alternate form of equation (1):

$$\Delta\delta = U_P \Sigma_P V_P^T \Delta P \quad (4)$$

where $U_P = [u_1 u_2 \ldots u_i \ldots u_n]$ and $V_P = [v_1 v_2 \ldots v_i \ldots v_n]$ are orthonormal matrices consisting of left and right singular vectors of $H_P$. Here $u_i = [u_{i1} u_{i2} \ldots u_{ik} \ldots u_{in}]^T$ and $v_i = [v_{i1} v_{i2} \ldots v_{ik} \ldots v_{in}]^T$. $\Sigma_P$ is a diagonal matrix consisting of the singular values of matrix $H_P$ and has the following form:

$$\Sigma_P = \begin{bmatrix} \sigma_1 & \ldots & 0 \\ \vdots & \ddots & \vdots \\ 0 & \ldots & \sigma_n \end{bmatrix} \quad (5)$$

The singular values ($\delta_i$) of $\Sigma_P$ relate change in real power (P) to change in bus angle (δ) or frequency (f) for the microgrid buses 119.

From equation (2), the largest singular value of $\Sigma_P$ indicates that a small change in matrix $H_P$ or ΔP will result in the largest change in Δδ (or δf). The re-synchronization unit 130 utilizes this relationship to identify the microgrid buses 119 with real power injections which have the maximum influence on the largest singular value.

In more detail, the influence of a microgrid bus 119 on a singular value can be measured using the sensitivity of the singular value with respect to bus variables. In the scenario described above, the bus variables are the diagonal elements of the matrix $H_P$. Matrix $H_P$ relates the amount of real power adjustment to the bus angle or frequency mismatch as previously described herein. Accordingly, the sensitivity ($P_{ki}$) of the $i_{th}$ singular value ($\delta_i$) with respect to the $k_{th}$ diagonal element ($h_{kk}$) of $H_P$ can be defined as:

$$p_{ki} = \frac{\partial \sigma_i}{\partial h_{kk}} \quad (6)$$

The re-synchronization unit 130 further defines the sensitivity as participation factor (PF). The participation factor is indicative of the relative participation of the respective bus real power in the corresponding singular value. The participation factor in terms of left and right singular vectors can be expressed as:

$$PF_{ki}^P = p_{ki} = u_{ik} v_{ik} \quad (7)$$

where $PF_{ki}^P$ is the participation of the $k_{th}$ bus active power in the singular value $\delta_i$. The matrix of participation factors for all singular values has the following structure.

TABLE 1

| | Real power injection bus | | | |
|---|---|---|---|---|
| | #1 | #2 | | #n |
| $\sigma_1$ | $PF_{11}^P$ | $PF_{12}^P$ | ... | $PF_{1n}^P$ |
| $\sigma_2$ | $PF_{21}^P$ | $PF_{22}^P$ | ... | $PF_{2n}^P$ |
| . | . | . | | . |
| . | . | . | | . |
| . | . | . | | . |
| $\sigma_n$ | $PF_{n1}^P$ | $PF_{n2}^P$ | ... | $PF_{nn}^P$ |

In the matrix shown in Table 1, the columns of each row indicate the participation of different microgrid buses 119 in the corresponding singular value. Also, the column sum of each row is equal to one. In other words, for the row corresponding to singular value $\delta_k$, the following holds true:

$$\Sigma_{i=1}^n PF_{ki}^P = 1 \quad (8)$$

As described earlier, the largest singular value will have the maximum impact on Δδ (or Δf) due to small change in ΔP. As such, the re-synchronization unit 130 can utilize the participation factors corresponding to the largest singular value in sharing the real power among the microgrid buses 119.

For example, in an n microgrid bus network, all buses can be equipped with energy resources (e.g. reciprocating engine generators, microturbines, fuel cells, photovoltaic/solar and other small-scale renewable generators, batteries, etc.). Assume the total demand in the network changes by $\Delta P_{net}$. By utilizing the participation factor, this change in demand can be shared between the energy resources. The energy resource at a microgrid bus with the highest participation factor will contribute the most to $\Delta P_{net}$, whereas the energy resources at other microgrid buses will share the total power in proportion to their participation factors. Assuming $\delta_1$ is the largest singular value, the microgrid controller 100 can distribute the net power $\Delta P_{net}$ as follows:

$$\Delta P_{net} = \Delta P_1 + \Delta P_2 + \ldots + \Delta P_n \quad (9)$$

where, $$\Delta P_1 = PF_{11}^P \Delta P_{net}$$

$$\Delta P_2 = PF_{12}^P \Delta P_{net}$$

$$\vdots$$

$$\Delta P_n = PF_{1n}^P \Delta P_{net}$$

In many cases, not all buses in a microgrid network have energy resources with output power control (e.g. photovoltaic/solar configured for maximum power point tracking). In addition, some microgrid buses 119 may need to be excluded from consideration because of one or more critical loads connected to those buses. In this scenario, the sum of the participation factors of resources selected for partaking in the re-synchronization power sharing effort is not equal to one.

The re-synchronization unit 130 can normalize the participation factor of these resources, so that the sum of their participation factors is equal to one. For example, a first microgrid bus (1) may be connected to a battery energy storage system, a second microgrid bus (2) may be connected to a diesel generator and the remaining microgrid buses may be connected to either a critical load or a distributed energy resource configured for maximum power transfer. In this non-limiting example, only the resources connected to the first and second buses share the net power $\Delta P_{net}$. The re-synchronization unit 130 normalizes their participation factors corresponding to $\sigma_1$ as given by:

$$PF_{11}^{P,new} = \frac{PF_{11}^{P}}{PF_{11}^{P} + PF_{12}^{P}}$$

$$PF_{12}^{P,new} = \frac{PF_{12}^{P}}{PF_{11}^{P} + PF_{12}^{P}}$$

where $PF_{11}^{P,new} + PF_{12}^{P,new} = 1$. Accordingly, $\Delta P_{net}$ will be shared as follows:

$$\Delta P_{net} = \Delta P_1^{new} + \Delta P_2^{new} \quad (10)$$

where $\Delta P_1^{new} = PF_{11}^{P} \Delta P_{net}$ and $\Delta P_2^{new} = PF_{12}^{P} \Delta P_{net}$.

The real power (P) re-synchronization techniques described above map directly to reactive power (Q) and voltage (V) control. In this scenario and assuming $\Delta P=0$, the relation between $\Delta Q$ and $\Delta V$ can be expressed as:

$$\Delta V = [J_{VV} - J_{V\delta} J_{\delta\delta}^{-1} J_{\delta V}]^{-1} \Delta Q \quad (11)$$

$$\Delta V = H_Q \Delta Q \quad (12)$$

$$\Delta V = U_Q \Sigma_Q V_Q^T \Delta Q \quad (13)$$

It is clear from equation (13) that for the largest singular value of $\Sigma_Q$, a small change in $\Delta Q$ will result in the largest change in $\Delta V$ where the singular values ($\sigma_i$) of $\Sigma_Q$ relate change in reactive power (Q) to change in voltage (V) for the microgrid buses under consideration. Accordingly, the re-synchronization unit 130 can use the largest singular value to compute the participation factors of microgrid buses with reactive power resources. Equations (11), (12) and (13) are similar to equations (1), (2), (3), and thus without loss of generality, the reactive power bus participation factors can be computed in the same way as previously described herein in connection with real power and bus angle/frequency control. Therefore, in the interest of brevity, these formulations are not reproduced herein for reactive power and voltage control.

As previously described herein in connection with a net change in real power, a net change in reactive power also can be shared between the microgrid energy resources in proportion to their respective participation factors. If all microgrid buses do not participate in reactive power support, then the participation factors of the participating reactive energy resources can be normalized and net reactive power can be shared according to the normalized participation factors also as previously described herein.

Figure 2:
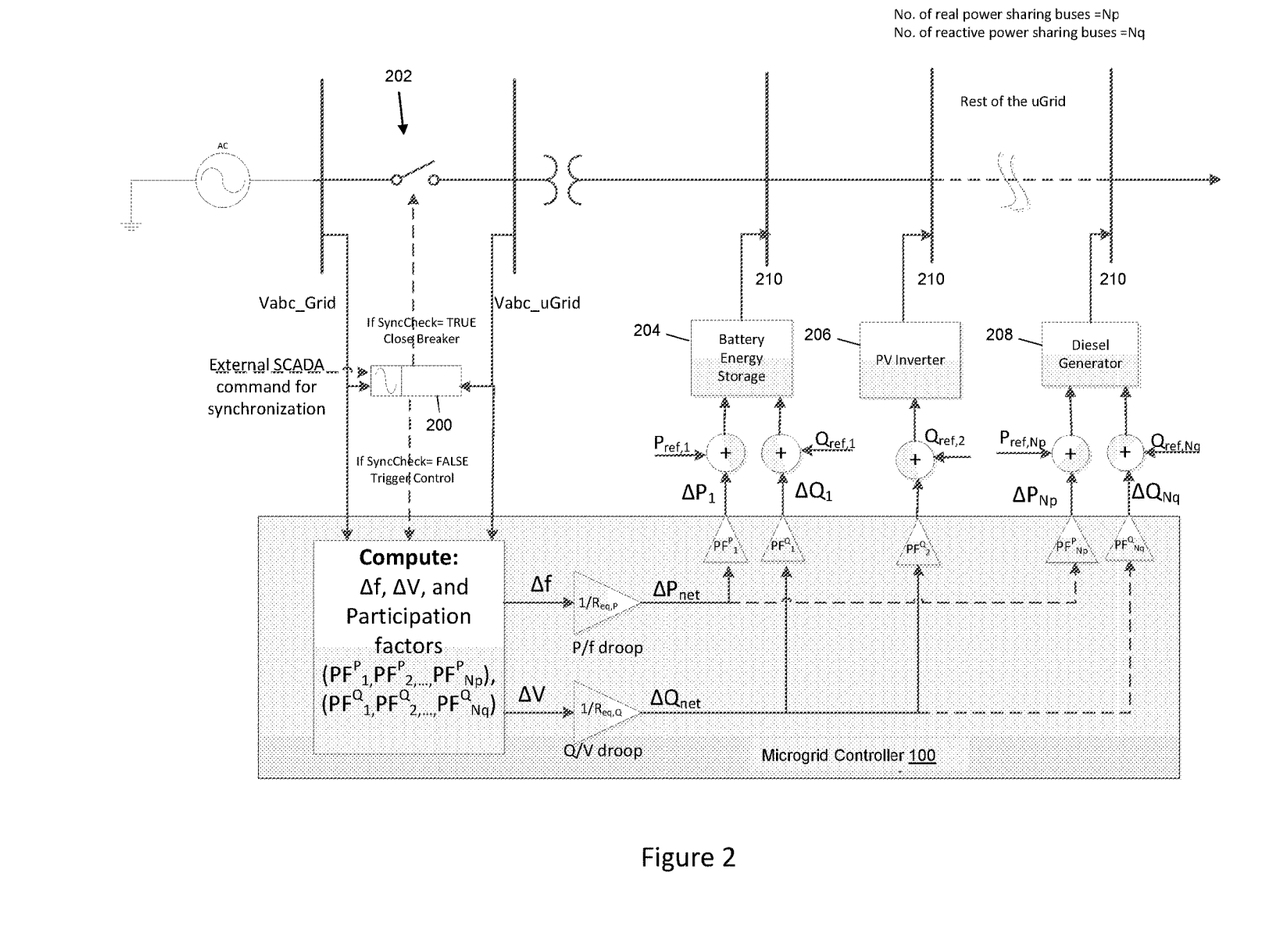
FIG. 2 illustrates a block diagram of another embodiment of a microgrid and corresponding controller which re-synchronizes the microgrid upon exiting islanded mode, based on a participation factor-based re-synchronizing technique.
Figure 3:
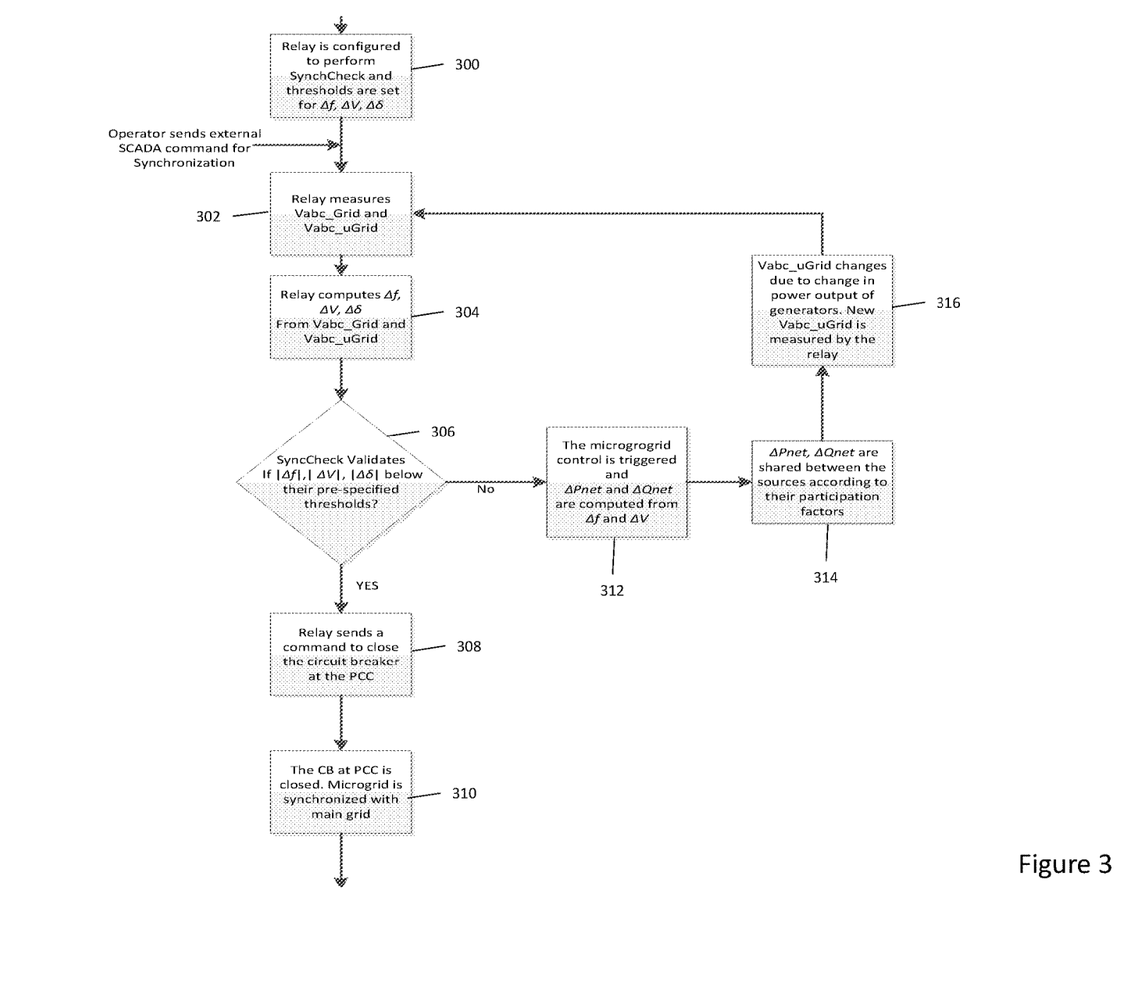
FIG. 3 illustrates a flow diagram of an embodiment of a method of re-synchronizing a microgrid upon exiting islanded mode, based on a participation factor-based re-synchronizing technique.

FIG. 2 illustrates an embodiment of the participation factor-based re-synchronization technique described herein as employed by an exemplary microgrid, and FIG. 3 illustrates a corresponding exemplary flow diagram for carrying out the re-synchronization technique. When the operator decides to connect the microgrid to a grid i.e. a substation or main utility grid (represented by a generic 'AC' source in FIG. 2), a command to trigger the re-synchronization is sent through SCADA (supervisory control and data acquisition) or other type of system designed for remote monitoring and control to an intelligent electronic device 200 that controls a circuit breaker 202 connected between the point of common coupling (PCC) of the grid and microgrid. A relaying device of the IED 200 begins its reclose interval timer and performs a synchronization check (SyncCheck) by measuring the voltage signals from both sides of the PCC and computes the differences in voltage magnitude $\Delta V$, frequency $\Delta f$ and phase angle $\Delta \delta$ (Blocks 300, 302, 304). If these differences are within the pre-specified thresholds (Block 306: YES), the relay confirms the SyncCheck condition as TRUE and sends a command to close the circuit breaker 202 connected between the points of common coupling (Block 308). After the circuit breaker 202 is closed, the microgrid is synchronized with the grid (Block 310). For example, according to IEEE (the Institute of Electrical and Electronics Engineers) standard 1547, the following thresholds must be met for re-synchronization to occur in cases of microgrids with aggregated DER rating of 1.5 to 10 MVA: $|\Delta V|<3\%$; and $|\Delta f|<0.1$ Hz, $|\Delta \delta|<10°$, where $|\Delta V|$ is a predetermined voltage mismatch threshold and $|\Delta \delta|$ is a predetermined bus angle mismatch threshold.

If the predetermined voltage and bus angle mismatch thresholds are not met (Block 306: NO), the relay confirms the Synchronism Check ('SyncCheck') condition as FALSE and triggers the participation factor-based re-synchronization control technique previously described herein via the microgrid controller 100 (Block 312). The microgrid controller 100 utilizes the voltage measurements at both sides of the point of common coupling and computes the mismatch between voltage magnitudes $\Delta V$ and frequency $\Delta f$ (Block 312). These differences are converted into real and reactive power mismatch e.g. by dividing $\Delta f$ and $\Delta V$ with their respective equivalent droops. The equivalent droop is defined as the droop seen by the point of common coupling towards the microgrid. The energy resources 204, 206, 208 connected within the microgrid operate in parallel, and the equivalent droop can be obtained as follows:

$$\frac{1}{R_{eq,P}} = \frac{1}{R_{1,P}} + \frac{1}{R_{2,P}} + \ldots \frac{1}{R_{m,P}} \quad (14)$$

$$\frac{1}{R_{eq,Q}} = \frac{1}{R_{1,Q}} + \frac{1}{R_{2,Q}} + \ldots \frac{1}{R_{n,Q}} \quad (15)$$

where $R_{eq,P}$ and $R_{eq,Q}$ are the equivalent P/f and Q/V droops as seen the point of common coupling, $R_{i,P}$ and $R_{i,Q}$ are the P/f and V/Q droops of individual energy resources 204, 206, 208, and m and n are the number of microgrid energy resources 204, 206, 208 with real and reactive power droop control, respectively.

The microgrid controller 100 then computes the net change in real and reactive power as follows:

$$\Delta P_{net} = \frac{1}{R_{eq,P}} \Delta f \quad (16)$$

$$\Delta Q_{net} = \frac{1}{R_{eq,Q}} \Delta V \quad (17)$$

If Np microgrid buses 210 participate in sharing the $\Delta P_{net}$ and Nq microgrid buses 210 participate in sharing the $\Delta Q_{net}$, the net real and reactive powers can be shared between the corresponding energy resources 204, 206, 208 using the normalized participation factors as previously described herein and in conjunction with equation (10). Depending on the sign (positive or negative) of $\Delta P_{net}$ or $\Delta Q_{net}$, the microgrid energy resources 204, 206, 208 can change their power output by increasing or decreasing their respective real and/or reactive power set points (Block 314). The change in real and/or reactive power output by each participating energy resource 204, 206, 208 changes the frequency and/or voltage at the microgrid side of the PCC bus (Block 316). Such power sharing via the use of participation factors can be performed at a sampling rate decided by the energy resource 204, 206, 208 with the slowest ramp rate. Once the predetermined re-synchronization threshold conditions are met, the sharing of power can be stopped because re-synchronization is achieved at that point.

Computation of the participation factors utilizes the knowledge of a load-flow Jacobean matrix which changes with operating conditions and network configuration change. Since microgrid re-synchronization is typically initiated by the operator, the configuration is known in advance. Furthermore, the nominal operating condition corresponding to this configuration can be used for participation factor computation as very precise knowledge of participation factor for each operating condition is not necessarily needed, because the normalized participation factor is a measure of relative participation.

Some microgrid energy resources may be controlled using frequency set point reference as an input instead of bus angle. For such energy resources, their shared power is multiplied by their droops and the frequency offset is added to the set points.

Also, violations in the generator capability curve limits, the power electronics component limits and/or the controller limits which occur due to power sharing can be handled by local controllers. Any excess power beyond the limit can be further shared between the remaining microgrid energy resources using normalized participation factors computed as previously described herein. In addition, if the system is designed in such a way that an operator can communicate the operating points of the energy resources to the microgrid controller 100, the energy resources which operate close to their limits can be excluded from participating in the power sharing by the controller 100.

The participation factors can be used beyond microgrid re-synchronization. In one embodiment, the participation factors can be further extended to intentional islanding. For example, if a system is to be islanded without some of the energy resources in operation (e.g. diesel generator), the load in a microgrid can be supplied by other energy resources according to their respective participation factors. That is, the set points of the available energy resources can be adjusted in accordance with their respective participation factors instead of merely disconnecting loads to enter islanded mode. In another embodiment, the participation factors are extended to load shedding. For example, the sensitivity information can be used to identify non-critical buses for load shedding. This way, the most sensitive buses i.e. the buses that have the most effect on transients are not arbitrarily disconnected based on some pre-programmed settings.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of re-synchronizing a microgrid to a main grid or substation, the microgrid including a plurality of buses to which energy resources and loads are connected, the method comprising:
    determining a degree of bus angle or frequency mismatch and bus voltage mismatch between the microgrid and the main grid or substation prior to re-synchronization;
    determining an amount of power adjustment needed to reduce the bus angle or frequency mismatch and bus voltage mismatch to below respective predetermined thresholds;
    determining at least one participation factor for each of the buses, each participation factor indicating an amount of influence power injection by the corresponding bus has on the bus angle or frequency mismatch or on the voltage mismatch;
    allocating the amount of power adjustment to the buses in proportion to the participation factors assigned to the buses; and
    re-synchronizing the microgrid to the main grid or substation responsive to the bus angle or frequency mismatch and bus voltage mismatch satisfying the respective predetermined thresholds.

2. The method of claim 1, wherein determining the amount of power adjustment needed to reduce the bus angle or frequency mismatch and bus voltage mismatch to below the respective predetermined thresholds comprises determining an amount of real power adjustment and an amount of reactive power adjustment needed to reduce the bus angle or frequency mismatch and bus voltage mismatch to below the respective predetermined thresholds.

3. The method of claim 2, wherein determining at least one participation factor for each of the buses comprises:
    determining a first participation factor for each of the buses which indicates an amount of influence real power injection by the respective buses has on the bus angle or frequency mismatch; and
    determining a second participation factor for each of the buses which indicates an amount of influence reactive power injection by the respective buses has on the voltage mismatch.

4. The method of claim 3, wherein allocating the amount of power adjustment to the buses in proportion to the participation factors assigned to the buses comprises:
    allocating the amount of real power adjustment to the buses in proportion to the first participation factors assigned to the buses; and
    allocating the amount of reactive power adjustment to the buses in proportion to the second participation factors assigned to the buses.

5. The method of claim 3, wherein determining the first participation factor for each of the buses comprises:
    performing a singular value decomposition of a matrix that relates the amount of real power adjustment to the bus angle or frequency mismatch so as to yield a diagonal matrix having singular values which relate change in real power to change in bus angle or frequency for the buses; and
    determining the sensitivity of the largest singular value to variables associated with the buses.

6. The method of claim 5, wherein the variables associated with the buses are the diagonal elements of the matrix that relates the amount of real power adjustment to the bus angle or frequency mismatch.

7. The method of claim 3, wherein determining the second participation factor for each of the buses comprises:
performing a singular value decomposition of a matrix that relates the amount of reactive power adjustment to the bus angle or frequency mismatch so as to yield a diagonal matrix having singular values which relate change in reactive power to change in bus angle or frequency for the buses; and
determining the sensitivity of the largest singular value to variables associated with the buses.

8. The method of claim 7, wherein the variables associated with the buses are the diagonal elements of the matrix that relates the amount of reactive power adjustment to the bus angle or frequency mismatch.

9. The method of claim 2, further comprising:
preventing one or more of the buses from contributing to the real power adjustment; and
normalizing the participation factors so that the sum of the normalized participation factors for the buses allowed to contribute to the real power adjustment equals one.

10. The method of claim 2, further comprising:
preventing one or more of the buses from contributing to the reactive power adjustment; and
normalizing the participation factors so that the sum of the normalized participation factors for the buses allowed to contribute to the reactive power adjustment equals one.

11. The method of claim 1, wherein allocating the amount of power adjustment to the buses in proportion to the participation factors assigned to the buses comprises instructing the energy resources connected to the buses to adjust their operating set points in proportion to the participation factors assigned to the buses.

12. The method of claim 11, further comprising:
excluding one or more of the resources from being considered in determining the participation factors for the buses, responsive to the one or more resources operating at or close to its maximum operating set point limit.

13. The method of claim 11, further comprising:
shedding one or more of the loads so as to enter islanded mode in which the microgrid is disconnected from the main grid or substation, in accordance with the participation factors assigned to the buses.

14. A controller for a microgrid that includes a plurality of buses to which energy resources and loads are connected, the controller comprising a re-synchronization unit operable to:
determine a degree of bus angle or frequency mismatch and bus voltage mismatch between the microgrid and the main grid or substation prior to re-synchronization;
determine an amount of power adjustment needed to reduce the bus angle or frequency mismatch and bus voltage mismatch to below respective predetermined thresholds;
determine at least one participation factor for each of the buses, each participation factor indicating an amount of influence power injection by the corresponding bus has on the bus angle or frequency mismatch or on the voltage mismatch;
allocate the amount of power adjustment to the buses in proportion to the participation factors assigned to the buses; and
re-synchronize the microgrid to the main grid or substation responsive to the bus angle or frequency mismatch and bus voltage mismatch satisfying the respective predetermined thresholds.

15. The controller of claim 14, wherein the re-synchronization unit is operable to determine an amount of real power adjustment and an amount of reactive power adjustment needed to reduce the bus angle or frequency mismatch and bus voltage mismatch to below the respective predetermined thresholds.

16. The controller of claim 15, wherein the re-synchronization unit is operable to determining a first participation factor for each of the buses which indicates an amount of influence real power injection by the respective buses has on the bus angle or frequency mismatch, and determine a second participation factor for each of the buses which indicates an amount of influence reactive power injection by the respective buses has on the voltage mismatch.

17. The controller of claim 16, wherein the re-synchronization unit is operable to allocate the amount of real power adjustment to the buses in proportion to the first participation factors assigned to the buses, and allocate the amount of reactive power adjustment to the buses in proportion to the second participation factors assigned to the buses.

18. The controller of claim 16, wherein the re-synchronization unit is operable to perform a singular value decomposition of a matrix that relates the amount of real power adjustment to the bus angle or frequency mismatch so as to yield a diagonal matrix having singular values which relate change in real power to change in bus angle or frequency for the buses, and determine the sensitivity of the largest singular value to variables associated with the buses.

19. The controller of claim 16, wherein the re-synchronization unit is operable to perform a singular value decomposition of a matrix that relates the amount of reactive power adjustment to the bus angle or frequency mismatch so as to yield a diagonal matrix having singular values which relate change in reactive power to change in bus angle or frequency for the buses, and determine the sensitivity of the largest singular value to variables associated with the buses.

20. The controller of claim 14, further comprising an energy management unit operable to instruct the energy resources connected to the buses to adjust their operating set points in proportion to the participation factors assigned to the buses.

21. The controller of claim 20, wherein the re-synchronization unit is operable to exclude one or more of the resources from being considered in determining the participation factors for the buses, responsive to the energy management unit indicating one or more of the resources is operating at or close to its maximum operating set point limit.

22. The controller of claim 20, wherein the energy management unit is operable to shed one or more of the loads so as to enter islanded mode in which the microgrid is disconnected from the main grid or substation, in accordance with the participation factors assigned to the buses.

23. A microgrid, comprising:
a plurality of buses;
energy resources and loads connected to the buses;
one or more points of common coupling for connecting the buses to a substation or main grid; and
a controller operable to:
determine a degree of bus angle or frequency mismatch and bus voltage mismatch between the microgrid and the main grid or substation prior to re-synchronization;

determine an amount of power adjustment needed to reduce the bus angle or frequency mismatch and bus voltage mismatch to below respective predetermined thresholds;

determine at least one participation factor for each of the buses, each participation factor indicating an amount of influence power injection by the corresponding bus has on the bus angle or frequency mismatch or on the voltage mismatch;

allocate the amount of power adjustment to the buses in proportion to the participation factors assigned to the buses; and re-synchronize the microgrid to the main grid or substation responsive to the bus angle or frequency mismatch and bus voltage mismatch satisfying the respective predetermined thresholds.

\* \* \* \* \*